United States Patent [19]
Laurent

[11] Patent Number: 5,840,196
[45] Date of Patent: Nov. 24, 1998

[54] WASTEWATER MANAGEMENT PRODUCT AND PROCESS

[76] Inventor: Craig Thomas Laurent, 17 W. Coolidge St., Battle Creek, Mich. 49017

[21] Appl. No.: 872,260

[22] Filed: Jun. 10, 1997

[51] Int. Cl.⁶ .................... C02F 1/32; C02F 3/28
[52] U.S. Cl. ................ 210/748; 210/758; 210/747; 210/170; 210/258; 210/532.2; 261/92; 422/24; 422/186.3
[58] Field of Search .................... 210/758, 759, 210/748, 747, 170, 258, 532.2; 261/92, 91; 422/24, 186.3

[56] References Cited

U.S. PATENT DOCUMENTS

| | | |
|---|---|---|
| 1,609,308 | 12/1926 | Pratt . |
| 1,735,142 | 11/1929 | Sugden . |
| 1,754,129 | 4/1930 | Travers et al. . |
| 2,922,489 | 1/1960 | Hollingsworth ............ 261/92 |
| 2,998,099 | 8/1961 | Hollingsworth ............ 261/92 |
| 3,109,875 | 11/1963 | Schramm et al. .......... 261/92 |
| 3,171,600 | 3/1965 | Eckey ........................ 261/92 |
| 3,452,873 | 7/1969 | Blough ....................... 261/92 |
| 3,744,774 | 7/1973 | Huisman et al. .......... 261/92 |
| 3,798,881 | 3/1974 | Schwarz et al. ........... 55/230 |
| 3,948,627 | 4/1976 | Schwarz et al. .......... 261/92 |
| 3,985,561 | 10/1976 | Newman .................... 210/54 |
| 4,010,110 | 3/1977 | Cosentino et al. ........ 252/314 |
| 4,031,006 | 6/1977 | Ramirez et al. ............ 210/44 |
| 4,104,166 | 8/1978 | LaRaus ................. 210/195 R |
| 4,104,167 | 8/1978 | Besik .................... 210/195 S |
| 4,170,554 | 10/1979 | Freshcora ................... 210/50 |
| 4,170,555 | 10/1979 | Vicard ........................ 210/74 |
| 4,253,951 | 3/1981 | McCune .................... 210/749 |
| 4,422,929 | 12/1983 | Owens ...................... 210/108 |
| 4,655,931 | 4/1987 | Kawamoto ............... 210/679 |
| 4,849,128 | 7/1989 | Timmons .................. 252/181 |
| 4,961,400 | 10/1990 | Lapray ....................... 261/92 |
| 5,026,477 | 6/1991 | Yen .......................... 210/169 |
| 5,077,007 | 12/1991 | Pearson ....................... 422/3 |
| 5,174,904 | 12/1992 | Smith ........................ 210/748 |
| 5,174,905 | 12/1992 | Shaw ........................ 210/760 |
| 5,290,435 | 3/1994 | Stilkenboom ............. 210/151 |
| 5,290,439 | 3/1994 | Buchwald ............... 210/198.1 |
| 5,374,358 | 12/1994 | Kaniecki ................... 210/704 |
| 5,494,576 | 2/1996 | Hoppe ..................... 210/198.1 |
| 5,589,132 | 12/1996 | Zippel ........................ 422/24 |

*Primary Examiner*—Neil McCarthy
*Attorney, Agent, or Firm*—Joseph K. Andonian

[57] ABSTRACT

An assembly comprising a wheel capable of rotating rapidly to aerosolize wastewater inside an enclosure designed for placement between a septic tank and its associated drainage area which reduces substantially the pathogenic organism content of effluent emanating from the septic tank. A source of UV light can be added inside the enclosure to further detoxify the effluent.

9 Claims, 2 Drawing Sheets

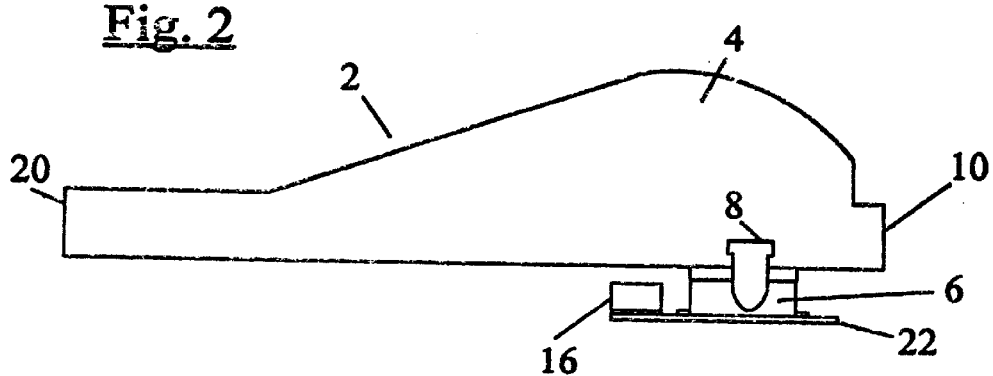
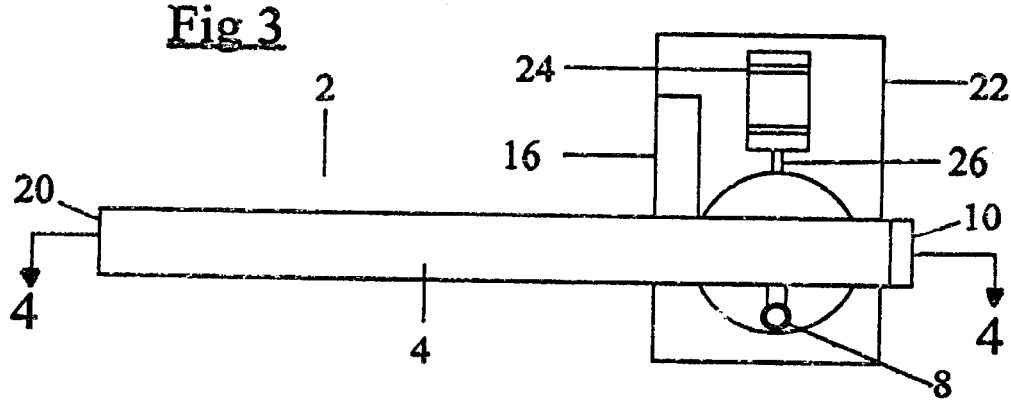
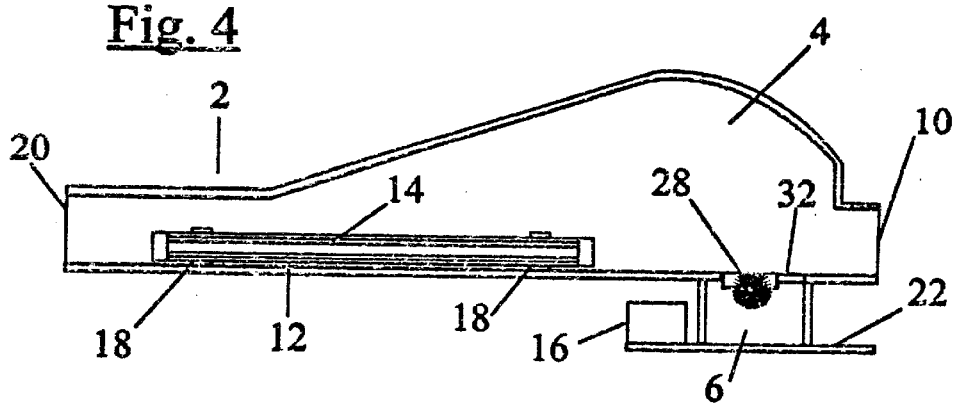

WASTEWATER MANAGEMENT PRODUCT AND PROCESS

This invention relates to a wastewater management product and process.

TECHNICAL FIELD

This invention relates to onsite wastewater management and a product and process especially designed to treat onsite wastewater on unsewered waterfront lots. The invention disinfects wastewater without the use of toxic chemicals or toxic residuals. The wastewater is treated instead by aerosolization, aeration, ultraviolet light radiation and ozonation.

BACKGROUND OF INVENTION

Approximately 25% of all housing units in the United States dispose of their wastewater using on-site treatment and disposal systems. The typical system consists of a septic tank and a soil adsorption system. The current technology utilizes settling of solids in the bottom of a septic tank and flow of the liquid effluent out of the top of the tank by either gravity or pumping to deliver the liquid wastewater to the soil adsorption system for treatment and disposal. This system has worked fairly well but it is well documented that pollution of ground and surface waters occurs where traditional septic systems are utilized.

The present product and process adds the step of generating wastewater aerosols by centrifugal atomization in an enclosure located between the septic tank and the soil adsorption system. A septic tank does a good job of settling solids and thence delivering water to a drainage field or dry well. The water flowing out of a septic tank is quite contaminated and requires ideal soil conditions around the dry well or drainage field for decontamination. Where soil conditions are not ideal the addition of aerosolization will greatly reduce the risk of contamination especially in areas where soil is clay-like or the water table is high. The addition of aeration, ultraviolet light radiation and ozonation to aerosolization results in even greater decontamination of wastewater.

SUMMARY OF INVENTION

The present invention provides an aerosol generator between the outlet from a septic tank and a drainage field or drywell. The system is capable of greatly reducing ground and surface water pollution while extending the life of the system. The aerosol generator disperses wastewater flowing out of a septic tank into a colloidal suspension by an atomizing unit that employs a wheel rotating at high speed to create an aerosol within an enclosure. The pathogen count is greatly reduced by the act of aerosolization alone. The pathogen count can be reduced even further by adding a source of UV light downstream from the aerosol generating wheel.

OBJECTS OF THE INVENTION

The principal object of the invention is to reduce contamination of wastewater in onsite disposal systems.

Another object of the invention is provide a product and process utilizing a compact aerosol generator between a septic tank and its associated disposal area to reduce contamination in onsite wastewater.

Still another object of the invention is to add a source of ultraviolet light to the aerosol generator to further reduce contamination of wastewater.

A even further object is provide such a product and process that can be easily and economically retrofitted to existing septic systems.

Other objects will be apparent from the description that follows.

GENERAL DESCRIPTION OF INVENTION

The product of this invention treats wastewater by providing means for turning wastewater into aerosols and, in its preferred embodiment, subjecting the aerosols to ultraviolet radiation and ozonation. Aerosolization increases the surface area of the wastewater by several orders of magnitude and correspondingly increases the rate of the chemical and biological reactions taking place between reactants in the wastewater as well as the environment in which aerosolization takes place.

The means employed to accomplish decontamination of the wastewater include an enclosure having a lower or contact chamber; an upper or treatment chamber; a panel inside the enclosure which acts as a splash retainer separating the two chambers; an opening in the panel; an opening or inlet from outside the enclosure into the lower chamber permitting effluent from a septic tank to flow into the enclosure; a wheel having a hub located inside the lower chamber and a small portion of the wheel extending into the upper chamber through the opening in the panel, the wheel being capable of spinning vertically at very high speed in the direction of an opening or outlet in the upper chamber which can be connected to a disposal area after drawing the effluent into the lower chamber and creating tiny droplets by contact of the effluent with the spinning wheel; an opening or inlet in the upper chamber, located just above the wheel and the opening in the panel separating the two chambers, through which air can be drawn to mix with and aerosolize the droplets of effluent in the upper chamber to aerate the aerosol particles; and a power source located outside the enclosure connected to the wheel by a shaft extending into the lower chamber and capable of turning the wheel at high speed. In the preferred embodiment of the invention, means are employed in the upper chamber downstream from the wheel to radiate and ozonate the aerosol particles with ultraviolet light when the aerosolized particles pass through the upper chamber.

BRIEF DESCRIPTION OF THE DRAWINGS

FIG. 2 is a side view of the invention.

FIG. 3 is a top view of the invention.

FIG. 4 is a cross section of the invention along lines A—A in FIG. 3.

LIST OF REFERENCE NUMERALS

Figure 1:
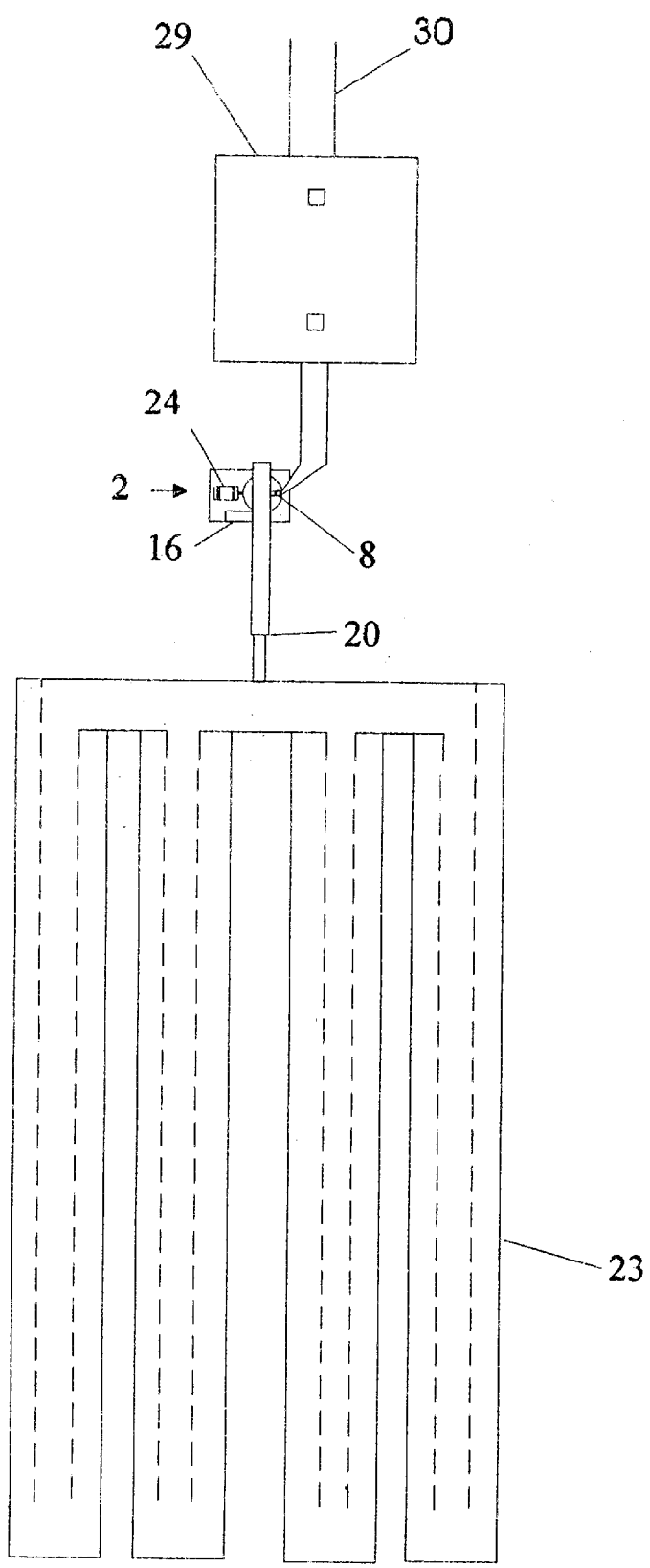
FIG. 1 is a schematic displaying the position occupied by the invention in an onsite wastewater treatment and disposal system.

2 Water treatment device
4 Upper or treatment chamber
6 Lower or contact chamber
8 Water inlet
10 Air inlet
12 Quartz tube
14 UV light
16 Light ballast
18 UV light holder 20 Outlet
22 Base
24 Electric motor
26 Shaft
28 Wire wheel
29 Septic tank
30 Waste water inlet
32 Splash retainer
33 Drainage field

PREFERRED EMBODIMENT OF THE INVENTION

The preferred embodiment of the invention suitable for use at part of a standard septic tank system consists of a base 22, a lower contact chamber 6, and an upper treatment chamber 4. The base 22 measures 12 inches by 16 inches and is constructed of pressure treated plywood although both the size and material used for the base 22 can be varied depending only on convenience, economy and the space available in a septic system. For example, plastic would be very acceptable material for the base 22. A circular PVC contact chamber 6 measuring 4 inches in diameter and 2 inches in height is mounted on the base 22. A 1½ inch circular hole is cut into the left side of the contact chamber 6 to accommodate the PVC influent pipe 8 and a ⅜ inch hole is drilled into the opposite or right side to accommodate the drive shaft 26 from the electric motor 24. A 1 horsepower, 120 volt electrical motor 24 is positioned horizontally on the base 22 so that the shaft 26 can fit through the ⅜ inch hole. The drive shaft 26 measuring 2½ inches in length and ¼ inch in diameter extends from the motor 24 through the ⅜ inch hole. A coulette, not shown, is attached to the shaft 26 and a separate ¼ inch shaft to which a wire wheel 28 is attached. The wire wheel 28 is aligned with the influent pipe 8.

During the operation of the water treatment device 2 as shown in the FIG. 1 schematic, wastewater 32 flows out of the septic tank 29 through the influent pipe 8 and is sucked into the rotating wire wheel 28 which is driven by the shaft 26 connected to and powered by the electric motor 24. The suction created by the wire wheel 28 rotating rapidly in the direction of outlet 20 also draws air into the lower chamber 6 through air inlet 10. Waste water 32 striking the wire wheel 28 is quickly aerosolized. The physical act of aerosolization greatly reduces the pathogen count in the water. It is not understood exactly how this happens. It may be due the production of droplets smaller than the microorganisms present. It may be due to the G forces created by impact against the spinning wheel or the simple act of aerosolization. All three phenomena may be at work. As the aerosol passes through the contact chamber 4 over the UV light 14, the pathogen count is further reduced. The treatment chamber 4 is constructed of PVC and fiberglass resin, is 44 inches long and 16½ inches high at the highest point, and is elliptical in shape. Many other materials including but not limited to other plastics would also be suitable to construct the chamber as well as the whole enclosure. A splash retainer is attached to the bottom of the treatment chamber 4 to allow the top of the wire wheel 28 to protrude into the treatment chamber 4. The UV lamp 14 produces ozone and has a germicidal action. It is installed 1 inch from the bottom inside of the treatment chamber 4 and 8 inches from the wheel 28. The lamp 14 is 29 inches long and is enclosed in a quartz tube 12 to avoid direct exposure to the wastewater. The quartz tube is held in place by two holders 18 located 1½ inches from each end of the lamp. The lamp 14 generates ultraviolet radiation both in the 254 millimicron wavelength (germicidal) and in the 185 millimicron wavelength (ozone producing). The lamp 14 generates approximately 30,000 microwatts 1 inch from the lamp 14 and would produce 3 grams of ozone per hour under ideal conditions. The indicated specifications for the UV lamp and the means for attachment to the device are not critical. The treatment chamber 4 terminates in a 4 inch diameter PVC circular opening that is designed for attachment to the pipe leading to the wastewater disposal area such as a drainage field 33.

Although a wire wheel is preferred, a solid disc can also be employed to break up the wastewater into tiny droplets. A densely packed wire wheel simply provides a larger surface and therefor more effectively breaks up the wastewater into tiny droplets. A solid disc would have to be larger in diameter to present the same surface area to the effluent as a wire wheel. The larger solid disc would also require more power to rotate fast enough to produce comparable aerosolization. The wire wheel can be rotated at a wide range of speeds, the fastest speed consistent with economy of operation and the capabilities of the equipment used is preferred. The wheel can also take on many shapes including but not limited to a cone or cylinder as long as the surface area and the speed of rotation are large enough to create a sufficient number of tiny droplets. The configuration, material composition and size of the chambers used are not critical. They are dictated more by practical considerations such as cost and space available on-site.

Test results by an independent laboratory using the foregoing preferred embodiment and rotating the wheel at 20,000 RPM demonstrate that total coliforms from a septic tank effluent were reduced by 99.999 percent and BOD5 by an average of 15.6 percent. Total solid stayed basically the same but are not considered of consequence for present purposes. Test results are summarized in the following table.

| SAMPLE | TOTAL COLIFORM | % REDUCTION | BOD | % REDUCTION |
|---|---|---|---|---|
| RAW WASTEWATER | 10,000,000 | | 360 | |
| *TREATED WASTEWATER | 300 | 99.997 | 300 | 16.666 |
| *TREATED WASTEWATER | 500 | 99.995 | 310 | 13.888 |
| RAW WASTEWATER | 60,000,000 | | 205 | |
| **TREATED WASTEWATER | 600 | 99.999 | 177 | 14.63 |
| **TREATED WASTEWATER | 400 | 99.99934 | 171 | 16.58 |
| UNITS | #/100 mL | | mg/L | |

*WITH 18" UV LIGHT
**WITH 30" UV LIGHT

Coliforms are a good indicator of total pathogens since they are more resistant than most pathogens. It is concluded that the device destroys almost all pathogens in the wastewater. Biochemical oxygen demand, usually identified as BOD5, an acronym for five day biochemical oxygen demand, is also used for determining the relative oxygen requirements for wastewaters. As an empirical bioassay-type procedure, it measures the dissolved oxygen consumed by microbial life while assimilating and oxidizing organic matter present.

The preferred device is small (16"W×17"H×44"L) and designed to be easily retrofitted between a septic tank and the drainage area in existing septic systems. Larger embodiments of the device would be suitable for applications other than septic systems to reduce the pathogen count of wastewater. The device works on the scientific principle that the rate of chemical and/or biological reaction is directly related to the rate the reactants are contacted with each other. The invention provides a three dimensional treatment of wastewater by aeration, ultraviolet light radiation and ozonation. The device is relatively inexpensive compared to alternatives such as sewer systems that cost 3 to 4 times more. It has approximately the same operational and maintenance costs. Benefits of the system include:

(1) Eliminates pathogenic bacteria from the wastewater without the use of toxic chemicals and leaves no toxic residual.
(2) Can be easily retrofitted to existing systems and requires less physical space than alternatives.
(3) Improves distribution to the disposal area minimizing incremental failure.
(4) Extends the life of the disposal area by aeration which facilitates the growth of more efficient aerobic microorganisms to break down the wastewater.
(5) Can be installed on small lots where other alternatives are impractical due to physical constraints.
(6) Minimizes the potential health risks associated with onsite wastewater management because of its capability to disinfect wastewater.
(7) Requires no operational expertise by the user.

The device was most especially designed to be an alternative for use on unsewered waterfront properties where small lots, inadequate isolation of well and septic systems, high water tables and ground and surface water contamination from septic systems causes potential health hazards and restricted body contact use of surface waters. It has special application to areas where (a) fractured rock is close to the surface, (b) soils are highly permeable, (c) water tables are high and ground and surface waters are therefore vulnerable to contamination, (d) soils are tightly packed and therefore the life of the disposal area will be extended and (e) in arid areas where wastewater reuse is and will be an important issue.

The products and processes of the invention disclosed herein represent preferred embodiments of the invention. Many other variations are possible but are too numerous to disclose in their entirety. The words and drawings used herein are merely descriptive and illustrative and are not intended to be exact representations of or inflexible limitations on the spirit and scope of the invention disclosed herein which can only be measured by the legally valid scope of the appended claims.

What is claimed is:

1. A waste water treatment assembly comprising
(a) an enclosure having an inlet end, an outlet end, a lower chamber, an upper chamber and a panel which acts as a splash retainer separating the two chambers,
(b) a rotatable wheel having a hub located inside the lower chamber and near the inlet end of the enclosure and a portion of said wheel protruding through an opening in the panel separating the two chambers,
(c) power source located outside of the enclosure connected by a shaft to the hub of the wheel,
(d) a conduit capable of accessing a source of waste water and delivering the waste water horizontally to the hub of the wheel within the lower chamber,
(e) a conduit capable of delivering air to a position above the wheel and the panel separating the two chambers, and
(f) a conduit capable of delivering the treated waste water out of the outlet end of the enclosure for further processing or disposal wherein said power source is capable of rotating the wheel vertically at speed sufficient to draw the waste water and air into the enclosure breaking the wastewater into droplets and mixing the droplets with air to aerosolize the wastewater in the upper chamber.

2. The assembly of claim 1 which includes an ultraviolet radiation emitting source located within the enclosure downstream from the rotatable wheel.

3. The assembly of claim 1 wherein the wheel comprises a plurality of wires of approximately equal length extending from the hub of the wheel.

4. The assembly of claim 3 wherein the wheel consists essentially of a round wire brush.

5. In an assembly designed to reduce pathogens in wastewater, the improvement comprising means between an outlet from a septic tank and a drainage field or drywell comprising a wheel capable of rotating at a speed within an enclosure sufficient to aerosolize and reduce the pathogens in the wastewater.

6. The assembly in claim 5 wherein the wheel consists of a plurality of densely packed wires of approximately equal length extending from the hub of the wheel.

7. A process for reducing the pathogens in wastewater by passing the wastewater through an enclosure having a lower chamber and an upper chamber, said process comprising delivering the wastewater to an opening in the lower chamber of the enclosure where a spinning wheel is located, said wheel protruding through an opening in a panel which separates the lower chamber from the upper chamber and acts as a splash retainer, delivering- air over the panel near the portion of the spinning wheel that protrudes into the upper chamber whereby the effluent is aerosolized, disinfected and permitted to exit from the enclosure through the upper chamber.

8. The process of claim 7 wherein the wheel consists essentially of a plurality of densely packed wires of approximately equal length extending from the hub of the wheel.

9. The process of claim 7 wherein the aerosolized wastewater is directed over an ultraviolet radiation emitting source located within the enclosure downstream from the wheel.

* * * * *